United States Patent [19]

Hansen et al.

[11] 4,224,784
[45] Sep. 30, 1980

[54] ATTACHMENT FOR LINE TRIMMER

[76] Inventors: Lee A. Hansen, 712 N. Piedra;
William A. Conrad, 1844 N. Piedra,
both of Sanger, Calif. 93657

[21] Appl. No.: 915,358

[22] Filed: Jun. 14, 1978

[51] Int. Cl.³ .............................................. A01G 3/06
[52] U.S. Cl. .................................... 56/16.9; 56/12.7; 56/256
[58] Field of Search .................. 56/256, 12.7, 16.9, 56/17.5, 295, 400.14, 400.15; 172/17

[56] References Cited

U.S. PATENT DOCUMENTS

| | | | |
|---|---|---|---|
| 1,523,729 | 1/1925 | Snyder | 172/17 |
| 2,638,730 | 5/1953 | Davidson | 56/400.14 |
| 3,708,967 | 1/1973 | Geist et al. | 56/295 |
| 3,788,049 | 1/1974 | Ehrlich | 56/16.9 |
| 3,831,278 | 8/1974 | Voglesonger | 56/295 |
| 3,977,078 | 8/1976 | Pittinger, Jr. | 56/12.7 |
| 4,062,114 | 12/1977 | Luick | 56/12.7 |
| 4,063,407 | 12/1977 | Tansey | 56/400.14 |

*Primary Examiner*—Jay N. Eskovitz
*Attorney, Agent, or Firm*—Clarence A. O'Brien; Harvey B. Jacobson

[57] ABSTRACT

This invention is a device for attachment with a line trimmer to convert it to an edge trimmer. The device has a collar with support legs attached to it and wheels attached to the support legs. A U-shaped brace is attached between the support legs holding them at an angle to each other. The collar is placed loosely around the handle of an existing line trimmer, the line trimmer is inverted in order to make its face perpendicular to the ground, the legs are inserted into the collar and the collar is then secured to the handle with the head of the line trimmer between the ends of the U-shaped brace.

4 Claims, 3 Drawing Figures

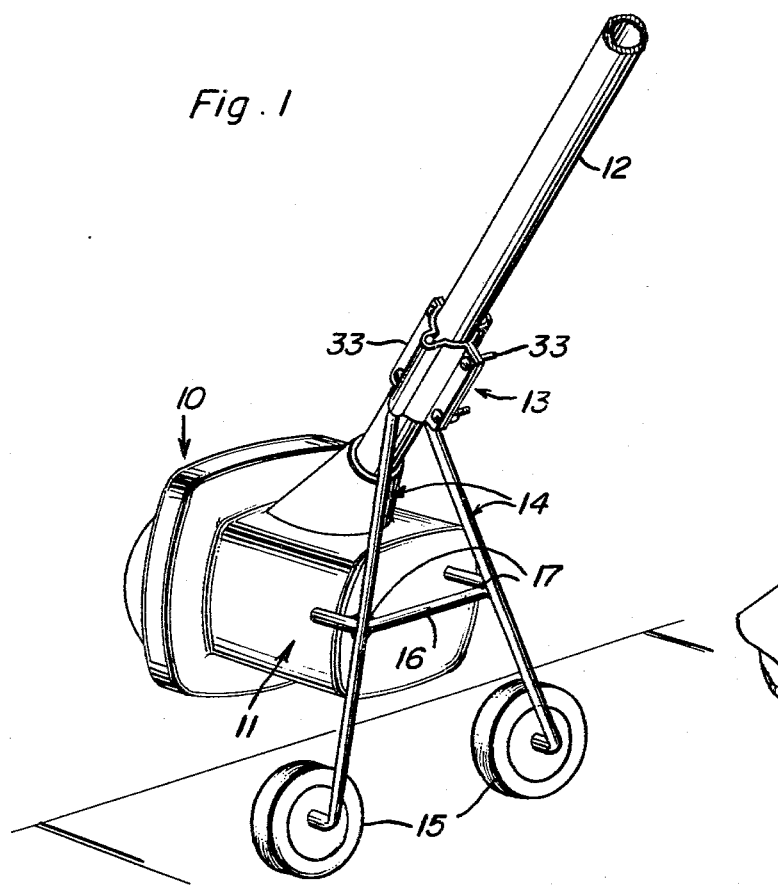
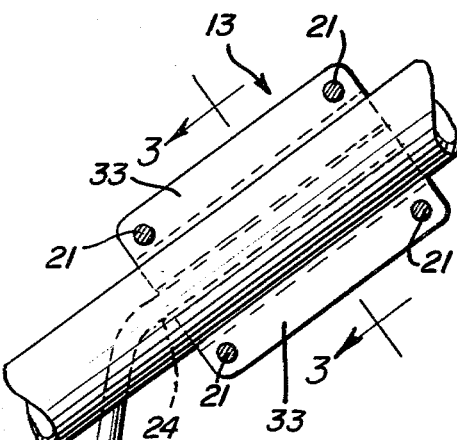
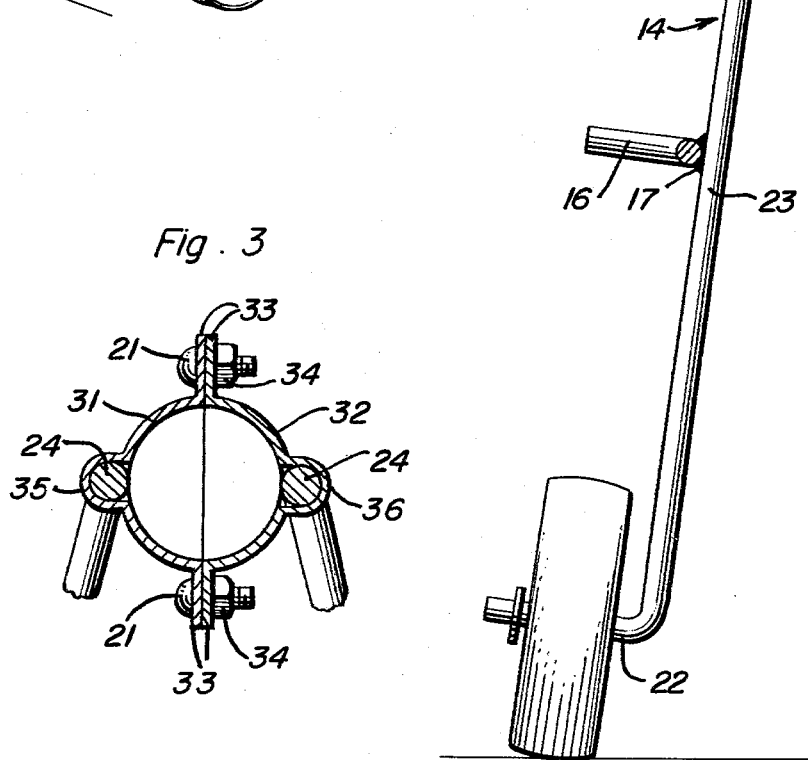

ATTACHMENT FOR LINE TRIMMER

BACKGROUND OF THE INVENTION

1. Field of the Invention

This invention relates to an attachment for line trimmers. Specifically, the invention relates to devices which can be attached to line trimmers in order to allow them to be used as line edgers.

2. Description of the Prior Art

Line edgers and line trimmers have been known and used for for years with U.S. Pat. Nos. 4,047,299 and 3,859,776 being illustrative thereof. Devices have also been provided which have the capability of being used as either a line edger or a line trimmer. However, prior conversion systems have been incorporated in the device at the time of manufacture and were purchased along with the device. No consideration was given to a person who bought a line trimmer and later found that he had need also for a line edger. The only recourse available in such a situation was to buy a second tool, namely, a line edger.

Typical conversion systems in the past are illustrated by such devices as the one shown in U.S. Pat. No. 2,832,184 to Beuerle. This device has the necessary features for conversion from an edger to a trimmer incorporated directly into the head of the machine. U.S. Pat. No. 3,221,481 to Mattson et al is another example of such a device. Here the adjustable mounting between the motor housing and the guide handle comprises a pair of collar members where one collar is an integral portion of the rear of the housing. Again such a device is not amenable for use with a machine which is not designed with a dual purpose in mind. A final example of a standard convertible type device can be seen in U.S. Pat. No. 3,561,199 to Lay. Here again it is obvious that structure must be incorporated in the handle and head of the device at the time of manufacture in order to allow for the conversion to take place. As with the other devices, the motor is turned with respect to the handle and the wheels.

SUMMARY OF THE INVENTION

The device disclosed herein has for one of its purposes the providing of an attachment for a preexisting line trimmer in order to make it useable as a line edger. The invention provides the user with a preformed collar, legs and wheels which can be easily attached to a preexisting line trimmer. The attachment can be made with simple household tools readily available to anyone without any modification whatsoever of the preexisting trimmer.

Another object of the device is to provide the user with an attachment of such lightweight that it can be left on the line edger even while being used as a line trimmer. The lightweight of the device is such that it will not interfere with the functioning of the line trimmer.

Another object of the invention is to provide a device which is easy and inexpensive to manufacture yet at the same time is durable.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the invention as attached to a standard line trimmer such as to make it useable as a line edger.

FIG. 2 is a side view of the device as attached to the handle of a line trimmer.

FIG. 3 is a sectional view of the mounting collar taken substantially upon a plane along section line 3—3 of FIG. 2.

DESCRIPTION OF THE PREFERRED EMBODIMENT

With reference to FIG. 1, it can be seen that face 10 of a conventional line trimmer 11 has been disposed perpendicularly to its usual horizontal operating position with respect to the ground. This has been accomplished by rotating handle 12 180 degrees with respect to its normal operating position. When the trimmer 11 is in proper position for edging, collar 13 is securely fastened to handle 12. Extending from collar 13 are support legs 14. At the ends of support legs 14 are wheels 15. These wheels are disposed in a parallel relationship to face 10 of the trimmer. Bracing bar 16 is securely attached to legs 14 preferably by use of weld joints 17. This brace bar 16 is of a general U-shaped configuration. The ends of the U are seen to surround or straddle the head of the trimming device 11 to stabilize the attachment. With the device in position as shown in FIG. 1, it can be seen that the operation is carried out by imposing a lateral force on handle 12 in the direction defined by wheels 15.

With reference to FIG. 2, further details of the invention can be seen. Four screws or bolts 21 hold the collar 13 in place. Disposed within collar 13 are the ends of support legs 14. Each support leg 14 is defined by three portions. These three portions are the wheel mounting shaft 22, main shaft 23, and mounting shaft 24. The support leg 14 is formed by making two bends in a rod of circular cross section. The wheel mounting shaft 22 is formed by making a 90 degree bend with respect to main shaft 23 and the mounting shaft is formed by making a bend which produces an obtuse angle with shaft 23. In FIG. 2 it can also be seen that bracing bar 16 is welded onto the middle section of main shaft 23.

FIG. 3 shows more clearly the details of collar 13 which is made up of two semi-cylindrical halves 31 and 32. Each half is of unitary construction and identical in shape to the other. The two halves of the collar are secured together forming a symmetrical configuration by use of screws 21 and nuts 34. In the center portion of each half of the collar, additional semi-cylindrical portions 35 and 36 are formed to accept mounting shafts 24. The mounting shafts 24 are held firmly in place by means of the pressure produced between the collar 13 and handle 12 when screws 21 and nuts 34 are tightened. It can be seen by reference to FIG. 2 that mounting shaft 24 extends for the entire length of the collar thus making this pressure and frictional engagement even more secure. The invention also includes the use of flanges 33 extending laterally outward from each edge of each half of the collar 13. These flanges are provided with holes therethrough to accept screws 21 and 34 in order to fasten the separate halves of the collars securely together.

Shafts 23 are disposed in a plane which is essentially parallel to operating face 10. Thus, in operation as a line edger, wheels 15 are resting on the ground and face 10 is essentially perpendicular to the ground, as shown in FIG. 1. When operated as a line trimmer, the entire device is turned 180 degrees, thus both the face 10 and shafts 23 are in planes which are parallel to the ground. In this manner, the device is held out of the way of the line trimmer but, by virtue of its lightweight, does not hinder the operation of the line trimmer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An attachment for converting a line trimmer into an edge trimmer comprising: a mounting collar, two legs for attachment to said mounting collar, each leg having fixedly, rotatably mounted to one end thereof a wheel, and a bracing bar firmly attached to the central portion of each of said legs, and further wherein said two legs each comprise a long shaft of circular cross section which has three portions, a main shaft, a wheel mounting shaft which extends from one end of the main shaft at a 90 degree angle thereto, and a mounting shaft which extends from the opposite end of the main shaft at an obtuse angle thereto and a bracing bar of U-shaped configuration securely attached to the center portion of each of said support legs with the ends of said U being parallel with said wheel mounting shafts and disposed in a generally opposite direction to said mounting shafts and also wherein the mounting shafts are parallel to each other, and the wheel mounting shafts are parallel to each other, and such that the main shafts generally form a V-shape with each other with the ends of the support legs attached to the wheel mounting shafts being in the wider portion of the V and wherein said wheels are mounted on said wheel mounting shafts to provide mobility.

2. The device of claim 1 and further in combination with a line trimmer having a head portion and a handle portion, and wherein said mounting collar is firmly attached to said handle portion in said mounting shafts of said support legs and further wherein each of said main shaft portions forms an obtuse angle with said mounting collar and also wherein said main shaft portions are in a plane which is essentially parallel to the head of said line trimmer, thus enabling its use as an edge trimmer.

3. An attachment for converting a line trimmer into an edge trimmer comprising: a mounting collar, two legs for attachment to said mounting collar, each leg having fixedly, rotatably mounted to one end thereof a wheel, and a bracing bar firmly attached to the central portion of each of said legs, said wheels being positioned in tandem relation, and further wherein said mounting collar is composed of two pieces wherein each piece is of unitary construction and of identical shape to the other to form a symmetrical collar when mounted therewith and wherein each piece is of generally large semi-circular cross section, the flanges extending radially outward on each end of the large semi-circular section for use in attaching said two pieces together and also wherein each of said pieces has a smaller semi-circular section formed in said large semi-circular section and extending radially outward therefrom for the mounting of said support legs therein and also where the two support legs each comprises a long shaft of circular cross section and has three portions, a main shaft, a wheel mounting shaft which extends from the end of the main shaft at a 90 degree angle thereto and a mounting shaft which extends from the opposite end of the main shaft at an obtuse angle thereto and a bracing bar of U-shaped configuration securely attached to the center portion of each of said support legs with the ends of said U being parallel with said wheel mounting shafts and disposed in a generally opposite direction to said mounting shafts, also such that the mounting shafts are parallel to each other and the wheel mounting shafts are parallel to each other and such that the main shafts generally form a V-shape with each other with the ends of the support legs having the wheel mounting shafts being in the wider portion of the V and wherein said wheels are mounted on said wheel mounting shafts to provide mobility.

4. A device as claimed in claim 3 and further in combination with a line trimmer having a head portion and a handle portion wherein said two pieces of said mounting collar are disposed circumferentially about opposite halves of said handle portion and securely fastened together and wherein said mounting portions of said supporting legs are disposed within the smaller semi-circular sections of said mounting collar and also wherein the ends of said U-shaped bracing bar extend toward and around each side of the head of said line trimmer and also wherein the main shafts of said support legs are disposed in a plane which is essentially parallel to the head of said line trimmer.

* * * * *